Figure 1:
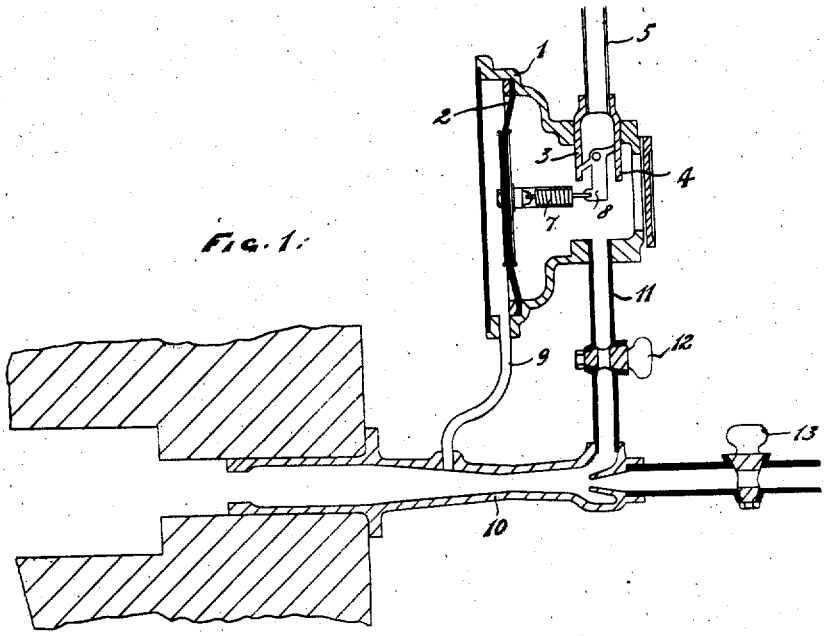

Nov. 22, 1927. G. KEITH. Re. 16,796

METHOD OF DELIVERING A MIXTURE OF GAS AND AIR OR OXYGEN FOR COMBUSTION.
Original Filed Sept. 19, 1916 2 Sheets-Sheet 1

Inventor:
George Keith,
By Albert Calvert, Attys.

Nov. 22, 1927. G. KEITH. Re. 16,796

METHOD OF DELIVERING A MIXTURE OF GAS AND AIR.

2 SHEETS—SHEET 2.

METHOD OF DELIVERING A MIXTURE OF GAS AND AIR OR OXYGEN FOR COMBUSTION
Original Filed Sept. 19, 1916 2 Sheets-Sheet 2

Inventor:
George Keith,
By Albert Calvert, Attys

Reissued Nov. 22, 1927. Re. 16,796

UNITED STATES PATENT OFFICE.

GEORGE KEITH, OF LONDON, ENGLAND, ASSIGNOR, BY DIRECT AND MESNE ASSIGNMENTS, TO JAMES KEITH & BLACKMAN COMPANY, LIMITED, OF LONDON, ENGLAND, A BRITISH COMPANY.

METHOD OF DELIVERING A MIXTURE OF GAS AND AIR OR OXYGEN FOR COMBUSTION.

Original No. 1,301,272, dated April 22, 1919, Serial No. 121,030, filed September 19, 1916. Patented in Great Britain, 1915, No. 16,711. Application for reissue filed November 1, 1926. Serial No. 145,675.

This invention relates to an improved method of delivering a mixture of gas and air (or oxygen) for combustion, for example, in a gas-fired furnace, oven or other installation, and it has for its primary object to render practicable the maintenance of the correct proportions of gas and air (or oxygen) irrespective of variations in the quantity of the mixture being dealt with.

The improved method consists broadly in injecting one of the constituents of the mixture and inducing the flow of the other constituent, while governing the pressure of the induced constituent to maintain the pressure proportionate to the resistance offered to the flow of the mixture, whereby variation in the resistance of the nozzle, of the furnace or the like being fired, or of the flue, may be automatically compensated for—it being understood that variation in the quality of the mixture must otherwise result from variation in the resistance to be overcome.

In this connection it may be pointed out that variation of the resistance may be due to variable heating up of the mixture before it issues from the nozzle, fluctuation of the temperature in the furnace or the like and consequent variation in the contraction of the products of combustion, introduction or withdrawal of materials being heated, opening or closing of doors or of dampers, variations of pressure in the flue, or to other causes, and that by the present invention the effect on the quality of the mixture of all such possible causes of variation may be automatically compensated for.

The preferred form of governing device employed comprises a diaphragm casing in which is fitted a thin membrane operatively connected with a valve serving to regulate the admission to the casing of the induced medium, the compartment of the casing at the back of the diaphragm being in communication with a point in the path of flow of mixture—preferably on the delivery side of the injector—so that it is influenced by variations in the static pressure obtaining in that part of the injector.

In certain cases, where the induced medium is gas, it may be sufficient for the purpose in view so to govern the gas pressure that the gas is previously brought to a pressure equal to that prevailing at the final outlet for the products of combustion, e. g. to atmospheric pressure, if the final discharge be directly into the atmosphere, or to the pressure prevailing in the chimney.

In case the gas pressure is to be maintained at atmospheric pressure, the back of the diaphragm may be left open; if the gas is to be brought to a pressure equal to that prevailing in the chimney, the connection from the back of the diaphragm may be led to the chimney.

Figure 2:
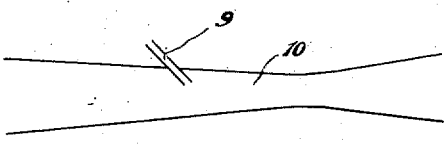
Figure 3:
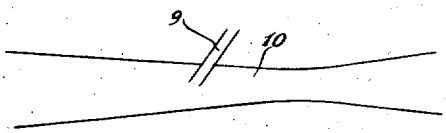
Figure 4:
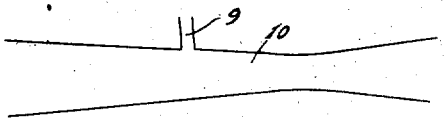
Figure 5:
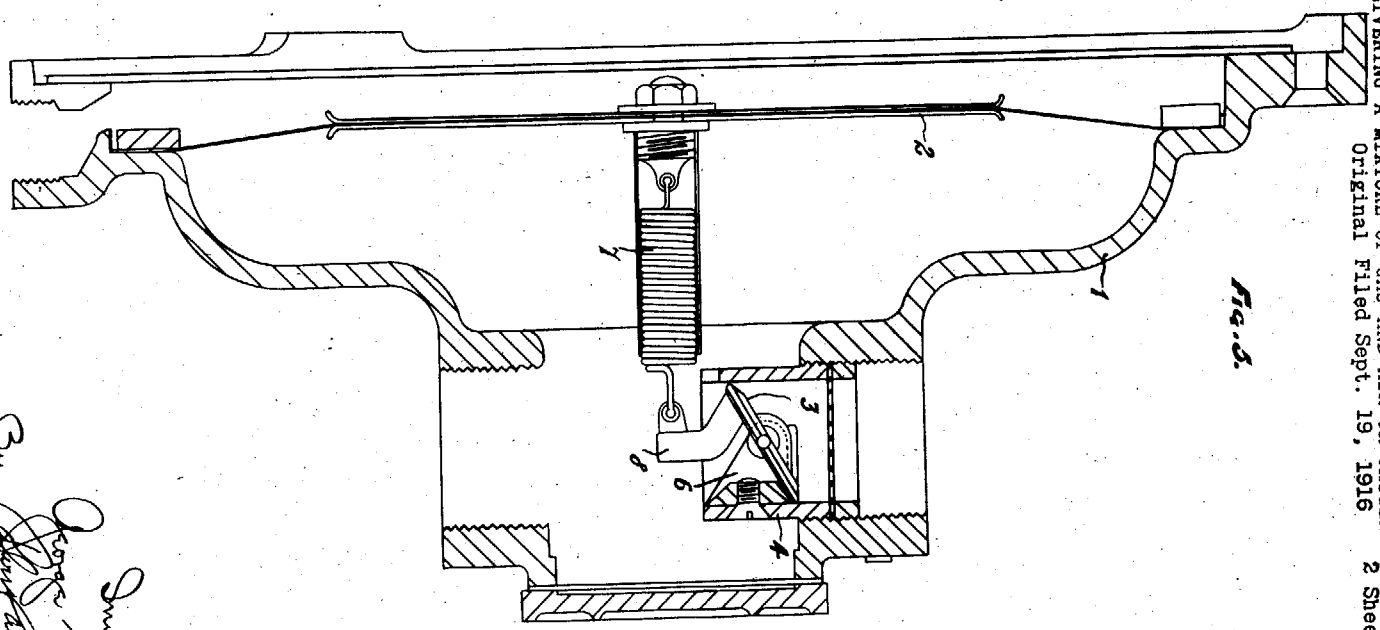

The invention is illustrated by way of example in the accompanying drawings in which Fig. 1 is a vertical section showing the diaphragm casing and injector with a connection from the back of the diaphragm to a point on the delivery side of the injector. Figs. 2, 3 and 4 represent diagrammatically three forms of connection. Fig. 5 is a vertical section through the diaphragm casing.

In the construction shown, the governor is designed to govern the pressure of gas—gas being the induced medium, and the injected medium being air or oxygen. It will be understood, however, that with suitable modification the governing device may be adapted to govern the pressure of the air or oxygen where the induced medium is air or oxygen and the injected medium is gas.

Referring to the drawings, 1 denotes the diaphragm casing in which is fitted a thin membrane 2 which is preferably disposed in a vertical plane to eliminate the effect of weight and is operatively connected with a valve 3, preferably constituted as a balanced butterfly valve of substantially elliptical form, adapted to be seated on the machined internal surface of a cylindrical valve casing 4 in communication with the gas inlet 5—it being understood, however, that any suitable form of valve, balanced or otherwise, may be provided.

The valve 3 is so mounted as to be immovable laterally though not liable to be jammed with grit or the like, being carried by a hinge pin passing through lugs on a bracket member 6 fitted within the casing 4.

The membrane 2 is operatively connected with the valve 3 by a closely wound helical spring 7 one end of which is connected to the membrane 2 and the other end of which is connected to the valve-operating lever 8, the spring being of sufficient strength to insure that the valve 3 shall be properly closed when the spring 7 is stressed but being capable of further extension in case of such accumulation of pressure of the gas on the membrane when the outlet of the governor is closed as to move the membrane against the face of the diaphragm casing—the arrangement being such as to obviate straining of the valve.

The connection between the back of the diaphragm and the injector is represented by a tube 9 which is led to the expansion tube 10 of the Venturi tube and which may terminate flush with the internal wall of the Venturi tube with its mouth facing "across stream", as in Figs. 1 and 4, or may project into the interior thereof with its mouth facing "up stream", as in Fig. 2, or "down stream", as in Fig. 3, or in any intermediate position, according as it is intended to establish pressure above or below that of the mixture in the expansion tube having regard to the conditions of construction and operation.

Whichever of the arrangements described be adopted, increase or decrease of the resistance offered to the flow is instantaneously responded to by the governor, the consequential alteration of the pressure of the gas supply to the injector resulting in maintenance of the uniformity of quality of the mixture.

It is to be understood that the connection to the back of the governor diaphragm need not be taken from the expansion tube but may be conveniently taken from any point between the inlet of the injector and the burner nozzle, or even from the furnace itself, although in the last mentioned case there will be no provision for compensation in respect of expansion before passage of the mixture through the nozzle.

To effect the initial adjustment of the proportions of gas and air or to effect any desired variation in the adjustment, a cock 12 or its equivalent is fitted in the connection 11 for delivering gas from the diaphragm casing 1 to the injector.

The cock 13 serves to regulate the supply of air to the injector.

While the apparatus illustrated is particularly applicable for delivering a self-burning mixture of gas and air to gas-fired furnaces, it is to be understood that the invention is not confined to such application, but includes the delivery of gas and air (or oxygen) in given proportions to ovens, burners or other installations—whether the mixture to be consumed be self-burning or otherwise.

If air (or oxygen) be the induced medium, the governing device will, of course, be interposed in the air (or oxygen) inlet connection and will serve to govern the pressure of the air (or oxygen) admitted, while the gas connection will be taken to the nipple of the injector.

What I claim is:—

The hereindescribed method of delivering a mixture of gas and a comburent medium for combustion, consisting in injecting the entire volume of one of the constituents of the mixture and thereby inducing the flow of the induced constituent and governing the pressure at which the induced constituent is supplied in direct proportion to the virtual pressure obtained at any predetermined point in the path of the mixture.

In testimony whereof I have signed my name to this specification.

GEORGE KEITH